(12) United States Patent
Steinbeiss

(10) Patent No.: US 7,527,553 B2
(45) Date of Patent: May 5, 2009

(54) AIR VENT, IN PARTICULAR FOR A VEHICLE

(75) Inventor: Sabine Steinbeiss, Selb (DE)

(73) Assignee: TRW Automotive Electronics & Components GmbH & Co. KG, Enkenbach - Alsenborn (DE)

( * ) Notice: Subject to any disclaimer, the term of this patent is extended or adjusted under 35 U.S.C. 154(b) by 0 days.

(21) Appl. No.: 11/315,610

(22) Filed: Dec. 22, 2005

(65) Prior Publication Data
US 2006/0172681 A1    Aug. 3, 2006

(30) Foreign Application Priority Data
Jan. 18, 2005    (DE) ................... 20 2005 000 794 U

(51) Int. Cl.
B60H 1/34    (2006.01)
E04B 1/16    (2006.01)
(52) U.S. Cl. ..................... 454/155; 52/385.1
(58) Field of Classification Search ............... 454/152, 454/154; 55/385.1
See application file for complete search history.

(56) References Cited
U.S. PATENT DOCUMENTS 5,575,715 A * 11/1996 Norbury et al. ............. 454/286
5,733,189 A * 3/1998 Eastwood ................... 454/155
6,610,116 B1 * 8/2003 Avery ........................ 55/385.1
2002/0072321 A1    6/2002 Kowalski et al.
2005/0136823 A1    6/2005 Metz

FOREIGN PATENT DOCUMENTS

| DE | 19701499 | 12/1997 |
|---|---|---|
| DE | 19807292 | 3/1998 |
| DE | 19711656 | 9/1998 |
| DE | 20018381 | 4/2001 |
| DE | 19947208 | 5/2001 |
| DE | 10209074 | 9/2003 |
| FR | 2791114 | 9/2000 |

* cited by examiner

*Primary Examiner*—Steve MaAllister
*Assistant Examiner*—Helena Kosanovic
(74) *Attorney, Agent, or Firm*—Tarolli, Sundheim, Covell & Tummino LLP

(57) ABSTRACT

An air vent, in particular for a vehicle, includes a housing (16), a ventilation part (14), and an assembly (24) which provides a connection between the housing (16) and the ventilation part (14) and permits a rotatable and pivotal mounting of the ventilation part (14) in the housing (16). The assembly (24) comprises a rail (30), a slider (26) that is displaceable on the rail (30), and a pivot bearing (34).

20 Claims, 5 Drawing Sheets

AIR VENT, IN PARTICULAR FOR A VEHICLE

TECHNICAL FIELD

The invention relates to an air vent, in particular for a vehicle.

BACKGROUND OF THE INVENTION

Such air vents are known in a variety of designs. In general, they are used to adjust in the desired manner the volume and the direction of an air flow that is supplied to a vehicle interior for air conditioning purposes.

Both rectangular and round air vents are known. With round air vents, a rotatable and pivotal mounting of a ventilation part in the housing is, for example, made possible by a cardan joint. In order to counteract the constant wear of the contact surfaces of the movable ventilation part in the housing, felt pads are known, which are, however, subjected to abrasion themselves and are, therefore, not permanently usable.

It is the object of the invention to create an air vent that is permanently operative and that is to be manufactured at low cost.

BRIEF SUMMARY OF THE INVENTION

According to the invention, an air vent, in particular for a vehicle, includes a housing, a ventilation part, and an assembly which provides a connection between the housing and the ventilation part and permits a rotatable and pivotal mounting of the ventilation part in the housing. The assembly comprises a rail, a slider that is displaceable on the rail, and a pivot bearing. The rotatable and pivotal mounting of the ventilation part is made possible by the assembly consisting of the rail, the slider, and the pivot bearing, the air flow that is supplied to the vehicle interior for air conditioning purposes being adjustable in the desired manner. This assembly may easily be manufactured, whereby a cost-effective air vent is ensured. The assembly may, for example, be produced in the in-mould-assembly-method, whereby assembly costs may be saved, because individual injection moulded parts do not have to be fitted to each other, but cure within one other. Moreover, an assembly produced in the in-mould-assembly-method ensures a mounting of the ventilation part in the housing without play.

Preferably, the slider is connected to the ventilation part. The slider, which is displaceable on the rail, ensures the rotatable mounting of the ventilation part. As an alternative, it would be possible too, to attach the rail to the ventilation part.

The slider may, for example, be connected to the ventilation part by means of a latching connection. In this way a simple, fast mounting of the slider and thus of the entire assembly at the ventilation part is possible.

Preferably, the rail comprises at each end a stop for the slider. At the same time the slider comprises one or several protrusions, so that the rotary movement of the ventilation part is limited, because when the stop hits the protrusion or protrusions the movement of the slider in the rail stops.

The rail may be configured to be curved in two directions. The curved shape of the rail enables the arrangement thereof in a gap between the dome-shaped ventilation part and the housing which is likewise dome-shaped in this portion. In this manner only a small space is required for the rail and thus for the entire assembly, and the air vent may be designed in a visually appealing manner.

According to an embodiment the rail is configured to be dovetailed or in the shape of a T-slot. Together with a slider that is complementarily configured, a guidance without play between the ventilation part and the housing is possible.

Preferably, the assembly is produced in the in-mould-assembly-method. Summarizing, in this method a first injection moulded part is produced in a first mould. Then, the first injection moulded part is removed from the first mould and placed in a second mould. In so doing, the first injection moulded part cures to such an extent and gains strength to such an extent that an injection moulding material, which, for example, fills up an opening of the first injection moulded part and cures therein to form a second injection moulded part may, be injected into the second mould. Although the second injection moulded part is then movable in the first injection moulded part, it is, nevertheless, non-detachably connected to the latter. In this arrangement the essential advantage is achieved that the second injection moulded part does not have to be fitted to the first one. Thus, an optimum accuracy in fitting may be achieved.

BRIEF DESCRIPTION OF THE PREFERRED EMBODIMENT

Figure 1:
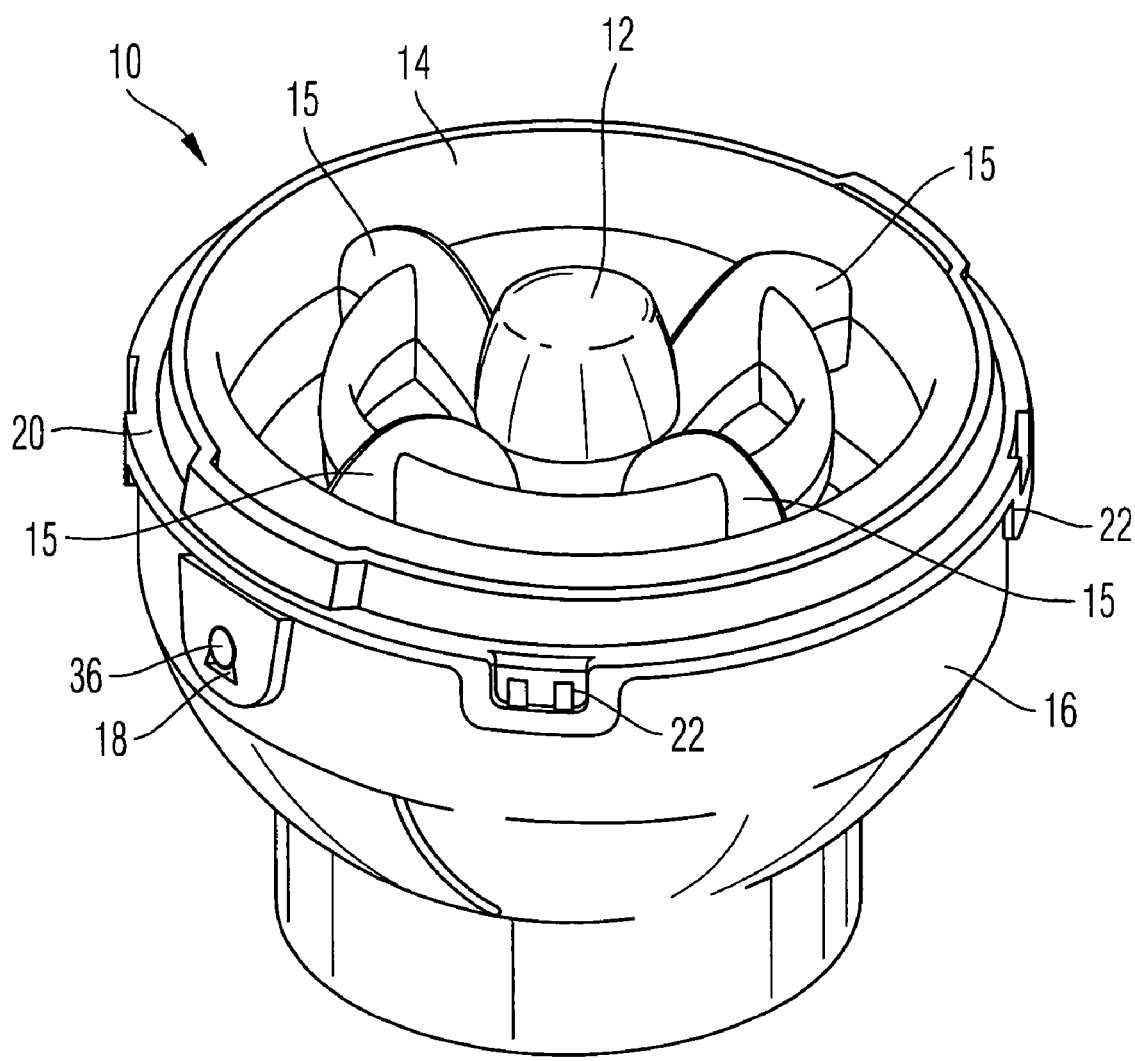
FIG. 1 shows a perspective view of an air vent in accordance with the invention in a first position including a housing.

FIG. 1 shows an air vent 10 for a vehicle ventilation, this air vent serving to control the direction and the volume of the air flow. The round air vent 10 as shown here may be actuated at a middle section 12 of a ventilation part 14 for adjusting the vanes and the shutoff flap (not shown). The exact connection between the middle section 12 of the ventilation part 14 and the vanes and the shutoff flap (not shown), respectively, is not illustrated here.

Disposed at the middle section 12 of the ventilation part 14 are four parts 15 that give the air vent a propeller-like appearance, in order to ensure a visual effect appealing to the vehicle occupant. In this arrangement the attachment of the parts 15 to the ventilation part 14 is sufficiently known and will not be explained here in more detail.

The ventilation part 14 is designed to be dome-shaped and is surrounded by a housing 16 (FIG. 1). In the portion in which the ventilation part 14 is disposed in the housing 16, the latter is likewise designed to be dome-shaped. In the further profile, the housing 16 is tubularly designed and provides the connection to the air inflow channel.

Figure 3:
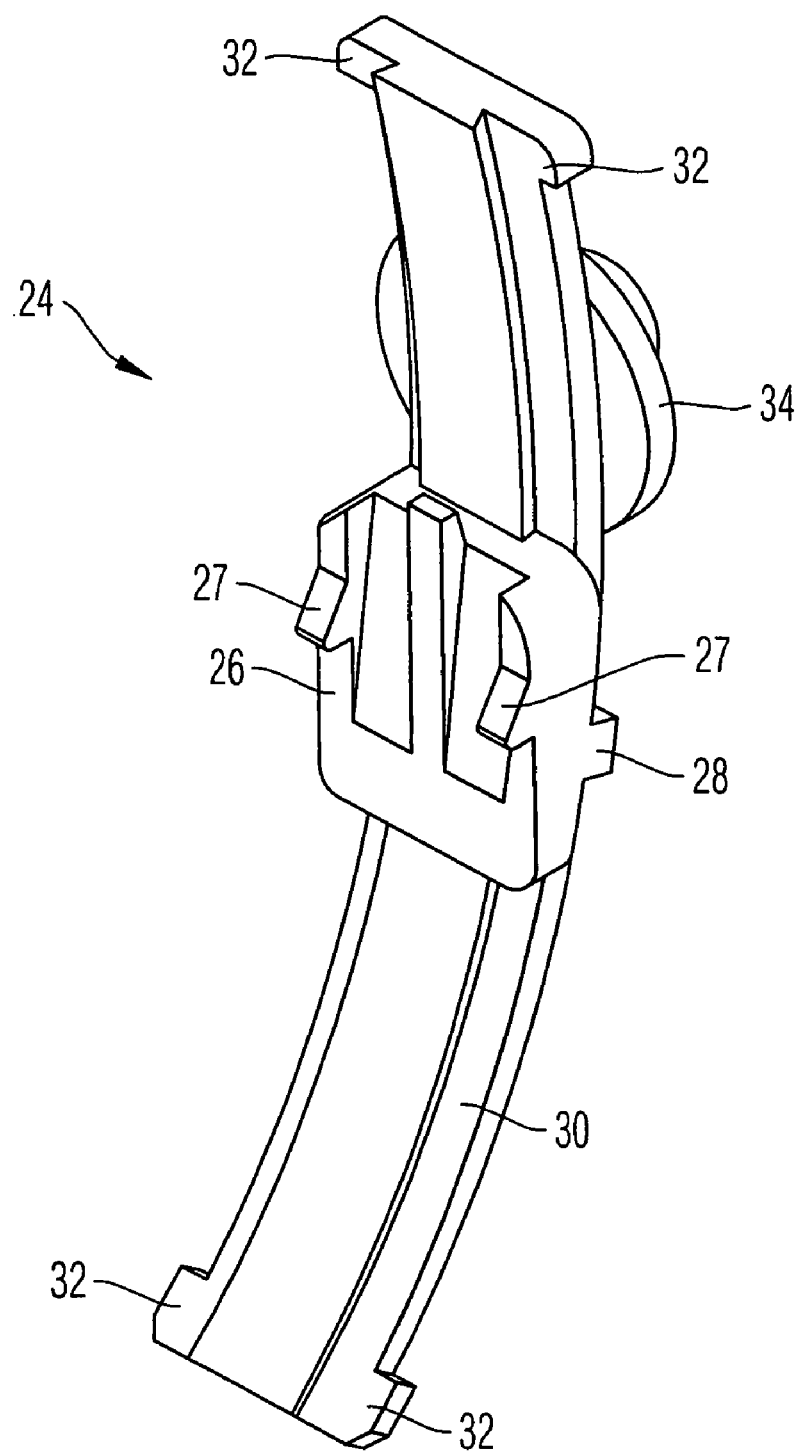
FIG. 3 shows a perspective view of an assembly of the air vent.

The ventilation part 14 is mounted on the housing 16 via an assembly 24 (see in particular FIG. 3). The assembly 24 consists of a slider 26 that is attached to the ventilation part 14 by means of a latching connection. In this arrangement the slider 26 comprises two latching noses 27 engaging in the ventilation part 14. At the opposite side of the latching noses 27 the slider 26 comprises protrusions 28 whose function will be explained hereinafter.

Besides, the assembly 24 comprises a rail 30 in which the slider 26 is displaceable. At each end the rail 30 comprises a stop 32, as will be explained hereinafter in more detail. The rail 30 and the slider 26 are shown in a dovetailed shape, but may also be configured in the shape of a T-slot. The rail 30 is configured to be curved in two directions, it having the same curvature as the ventilation part 14 and the housing 16, in order to be incorporated in a gap between the ventilation part 14 and the housing 16.

To cover the gap between the housing 16 and the ventilation part 14, there is disposed a cover 20. The latter is visible in the vehicle interior to the vehicle occupant and ensures a visually appealing design of the air vent 10. The cover 20 is annularly designed and locks into place at the housing 16 by means of latching sections 22 (see in particular FIG. 1).

The assembly 24 comprises a pivot bearing 34 which in turn comprises a bearing pin 36 that is attached to the rail 30. The bearing pin 36 provides a connection between the ventilation part 14 and the housing 16 and is rotatably mounted in a recess 18 in the housing 16. The housing 16 is reinforced in the portions of the two recesses 18 which are situated on the opposite sides of the housing 16, in order to ensure a necessary strength at the bearing point.

The assembly 24 including the rail 30, the slider 26, and the pivot bearing 34 is produced in the in-mould-assembly-method. This plastic injection moulding method permits an optimum accuracy in fitting and rotary and swivelling movements of the ventilation part 14 in the housing 16 without play.

Figure 2:
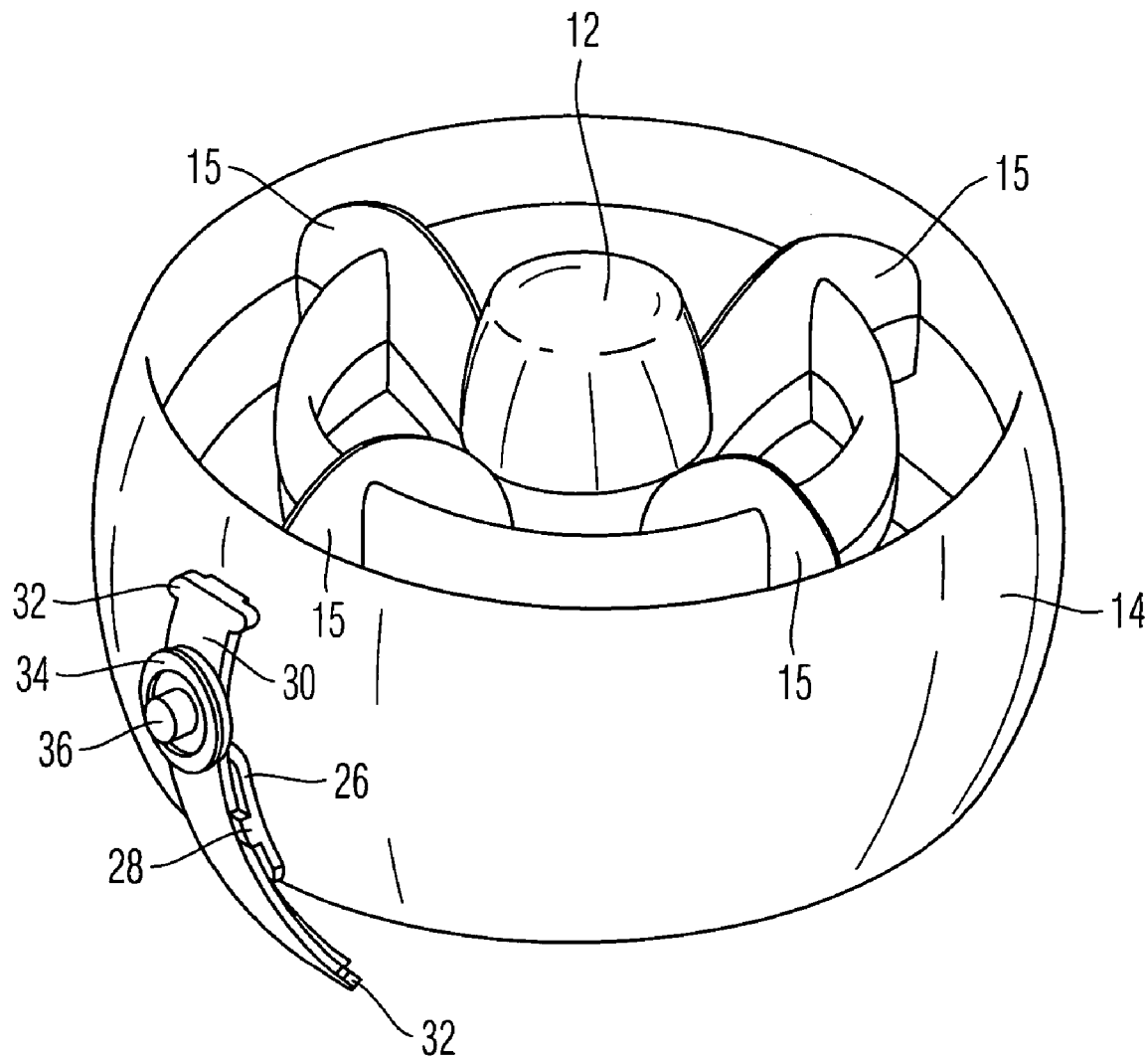
FIG. 2 shows a perspective view of the air vent of FIG. 1 in the first position without the housing.

The different rotary and swiveling movements of the air vent 10 are shown in the figures. For example, FIGS. 1 and 2 show the ventilation part 14 in a non-swivelled and non-rotated position.

Figure 4:
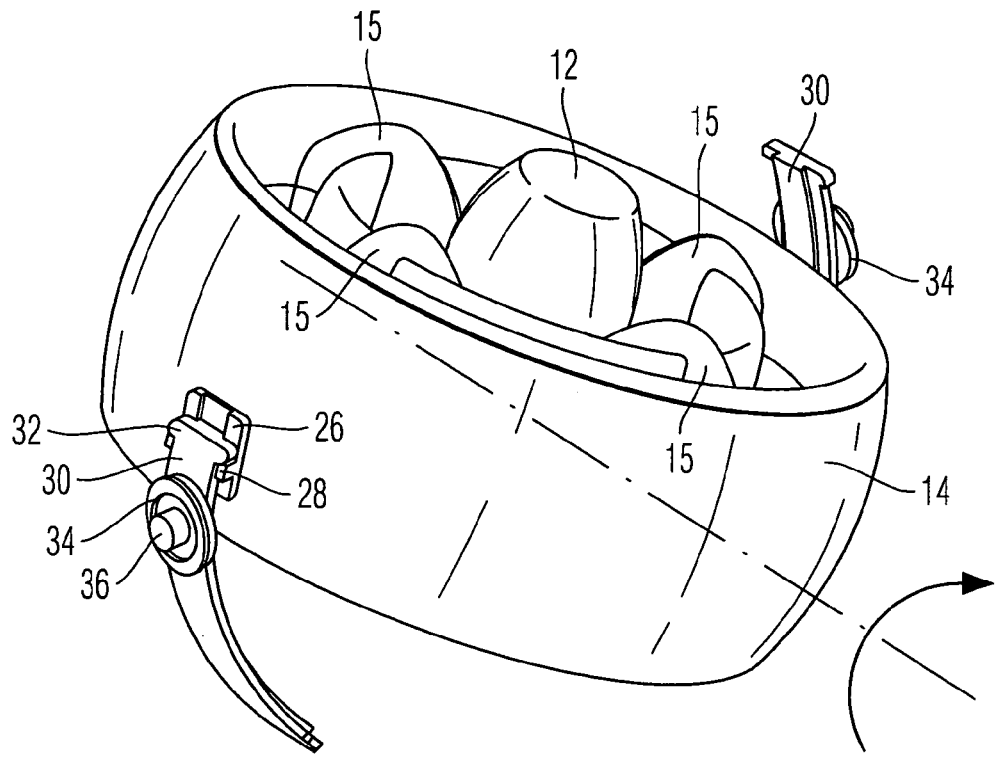
FIG. 4 shows a perspective view of the air vent in accordance with the invention in a second position without the housing.

In FIG. 4, the ventilation part 14 is shown in its maximum rotated position. In this position the stop 32 of the rail 30 rests against the protrusions 28 of the slider 26. In so doing, the stop 32 of the rail 30 and the protrusions 28 of the slider 26 limit the movement of the slider 26 in the rail 30. In this position the stop 32 of the rear rail 30 that is only partly visible because it is concealed by the ventilation part 14 likewise rests against the protrusions 28 of the slider 26.

Figure 5:
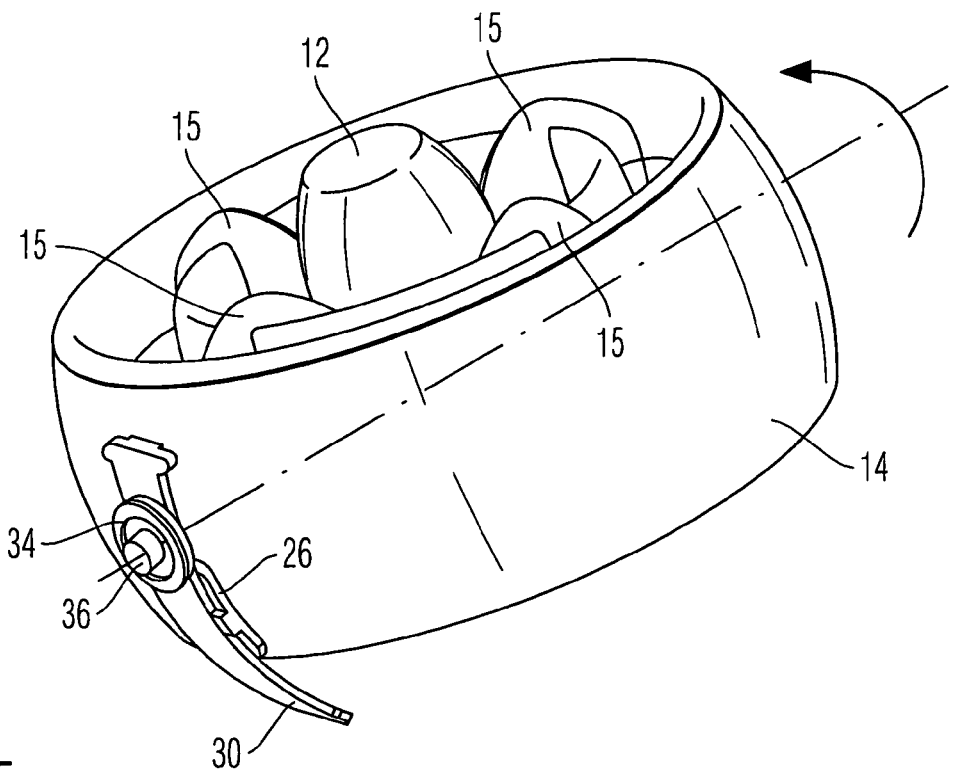
FIG. 5 shows a perspective view of the air vent in accordance with the invention in a third position without the housing.
Figure 6:
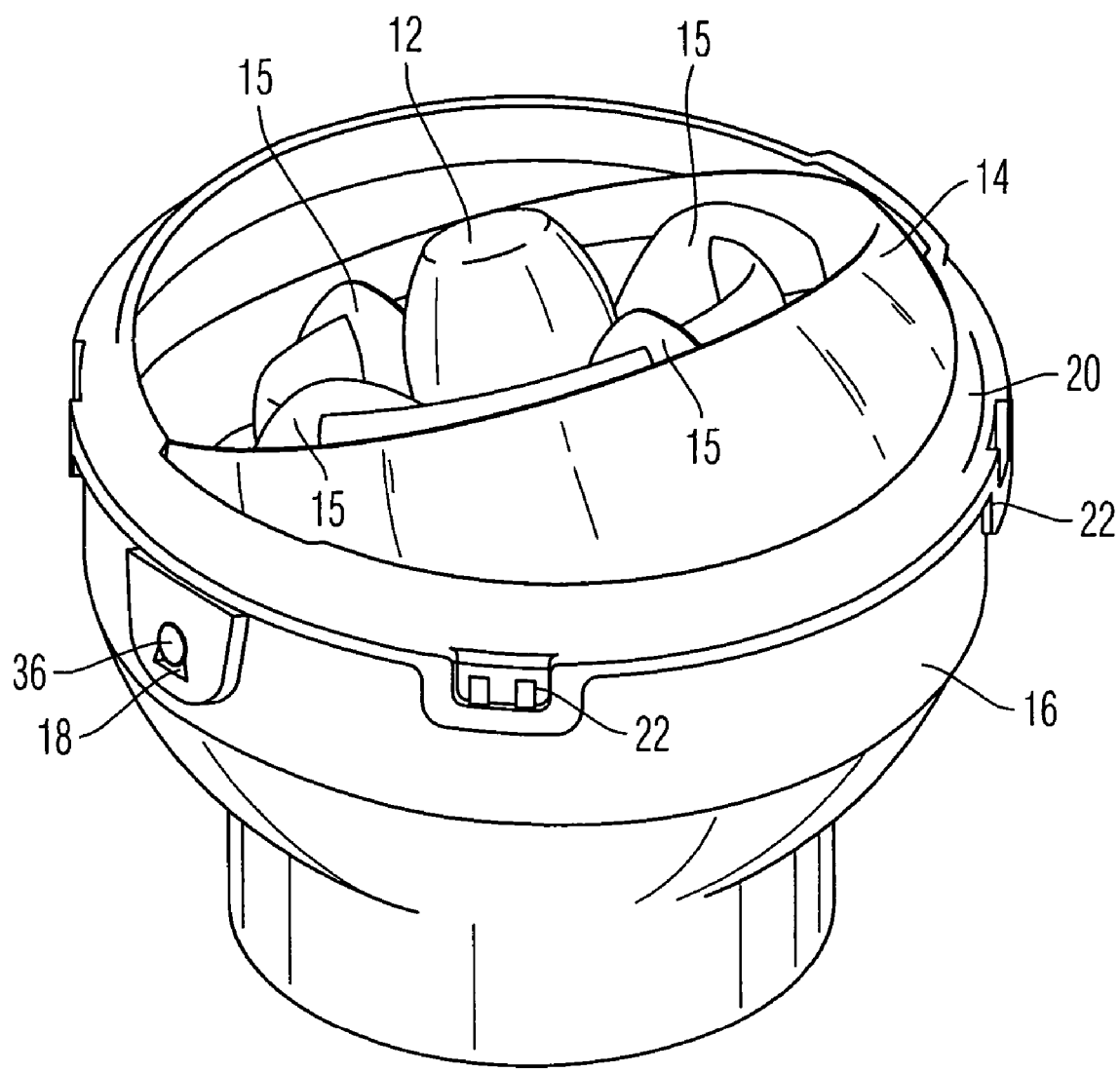
FIG. 6 shows a perspective view of the air vent of FIG. 5 in the third position including the housing.

FIGS. 5 and 6 show the ventilation part 14 in a third position. The slider 26 is situated here, as in FIGS. 1 and 2, in a non-rotated position, whilst the ventilation part 14 is swivelled about the pivot bearing 34, as apparent by the arrow and in FIG. 6.

It is further apparent in FIG. 6 that the swivelling movement of the ventilation part 14 is restricted by the recess 18 in the housing 16. The ventilation part 14 is shown here in the maximum swivelled position. In this position the pivot bearing 34 hits the rim of the recess 18 of the housing 16 and may not be moved any further.

The assembly 24 permits a rotatable and pivotal mounting of the ventilation part 14 in the housing 16. Since the assembly 24 consists of few components, both a saving in space and a cost-effective embodiment of the air vent 10 are ensured. The assembly 24 produced in the in-mould-assembly-method permits in this arrangement a mounting without play and thus an optimum accuracy in fitting of the ventilation part 14 in the housing 16.

The invention claimed is:

1. An air vent, in particular for a vehicle, including a housing (16),
    a ventilation part (14), and
    an assembly (24) which provides a connection between said housing (16) and said ventilation part (14) and permits a rotatable and pivotal mounting of said ventilation part (14) in said housing (16), said ventilation part (14) being rotatable about a first axis and pivotal about a second axis that is different from said first axis,
    said assembly (24) comprising an elongate rail (30), a slider (26) that is displaceable on said rail (30), and a pivot bearing (34), said slider (26) translating on said rail (30) in a longitudinal direction of said rail (30) from one end of said rail (30) to another end of said rail to rotate said ventilation part (14) about said first axis.

2. The air vent according to claim 1, wherein said slider (26) is connected to said ventilation part (14).

3. The air vent according to claim 2, wherein said slider (26) is connected to said ventilation part (14) by means of a latching connection.

4. The air vent according to claim 1, wherein said rail (30) comprises at each end a stop (32) for said slider (26).

5. The air vent according to claim 1, wherein said pivot bearing (34) comprises a bearing pin (36).

6. The air vent according to claim 5, wherein said bearing pin (36) is attached to said rail (30).

7. The air vent according to claim 1, wherein said rail (30) is configured to be curved in two directions.

8. The air vent according to claim 1, wherein said rail (30) is configured to be dovetailed.

9. The air vent according to claim 1, wherein said rail (30) is configured to be in the shape of a T-slot.

10. The air vent according to claim 1, wherein said assembly (24) is produced in the in-mould-assembly-method.

11. The air vent according to claim 1, wherein said housing (16) has a longitudinal axis, said ventilation part (14) being rotatable about an axis that is transverse to the longitudinal axis of said housing (16).

12. An air vent for a vehicle comprising:
    a housing;
    a ventilation part;
    an elongate a rail connected with one of said housing and said ventilation part;
    a slider displaceable along said rail and connected with the other of said housing and said ventilation part, said slider translating in a longitudinal direction of said rail from one end of said rail to another end of said rail to move said ventilation part relative to said housing; and
    a pivot bearing permitting pivotal movement of said ventilation part relative to said housing.

13. The air vent according to claim 12 wherein said slider includes at least one protrusion to limit displacement of said slider along said rail in the longitudinal direction.

14. The air vent according to claim 12 wherein said slider includes a groove for receiving said rail to guide movement of said slider in the longitudinal direction along said rail.

15. The air vent according to claim 12 wherein said slider is configured complementary to the shape of said rail.

16. The air vent according to claim 12 wherein said slider and said rail mount said ventilation part for rotation about said first axis relative to said housing.

17. The air vent according to claim 4 wherein said slider includes at least one protrusion that cooperates with said stop of said rail to limit displacement of said slider on said rail in the longitudinal direction.

18. The air vent according to claim 1 wherein said slider includes a groove for receiving said rail to guide movement of said slider in the longitudinal direction along said rail.

19. The air vent according to claim 1 wherein said slider is configured complementary to the shape of said rail.

20. The air vent according to claim 1 wherein said slider and said rail mount said ventilation part for rotation about said first axis relative to said housing.

* * * * *